(12) United States Patent
Bunnell et al.

(10) Patent No.: US 12,736,371 B2
(45) Date of Patent: Sep. 15, 2026

(54) VIRTUAL ODOMETER FOR ELECTRIC VEHICLES

(71) Applicant: GM GLOBAL TECHNOLOGY OPERATIONS LLC, Detroit, MI (US)

(72) Inventors: Justin Bunnell, Farmington Hills, MI (US); Andrew M. Zettel, Port Moody (CA); Yanyan Zhang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 648 days.

(21) Appl. No.: 18/121,165

(22) Filed: Mar. 14, 2023

(65) Prior Publication Data

US 2024/0310187 A1 Sep. 19, 2024

(51) Int. Cl.
*G01C 22/02* (2006.01)
*B60L 50/60* (2019.01)
*B60L 58/12* (2019.01)

(52) U.S. Cl.
CPC .............. *G01C 22/02* (2013.01); *B60L 50/60* (2019.02); *B60L 58/12* (2019.02); *B60L 2240/12* (2013.01)

(58) Field of Classification Search
None
See application file for complete search history.

(56) References Cited

U.S. PATENT DOCUMENTS 6,649,289 B2 * 11/2003 Hsu ......................... B60L 58/30 429/513
2018/0188332 A1 * 7/2018 Newman ................ B60K 35/10
2021/0170903 A1 * 6/2021 Tsuchiya ................ B60L 50/60
2023/0311694 A1 * 10/2023 Saita ....................... B60L 53/67 700/295
2023/0318338 A1 * 10/2023 Saita ......................... H02J 7/90 320/135

OTHER PUBLICATIONS

Proposal for a new UN GTR on In-vehicle Battery Durability for Electrified Vehicles, Economic Commission for Europe Inland Transport Committee Economic Commission for Europe Inland Transport Committee World Forum for Harmonization of Vehicle Regulations, Jun. 1-4, 2021 (Year: 2021).*
Proposal for a new UN GTR on In-vehicle Battery Durability for Electrified Vehicles. Economic Commission for Europe; Inland Transport Committee; World Forum for Harmonization of Vehicle Regulations; Eighty-third session; Geneva, https://unece.org/sites/default/files/2021-10/GRPE-84-01e%20-%20track 0.pdf <https://protect-us.mimecast.com/s/jKWsCW6wLpCzXV52CxneP3?domain=unece.org>; Jun. 1-4, 2021; 38 pages.

* cited by examiner

*Primary Examiner* — Jennifer M Anda

(57) ABSTRACT

A method for estimating a virtual distance corresponding to power supplied by an electric vehicle (EV) to offboard loads includes monitoring one or more enabling conditions comprising at least one of a speed of the EV, an active/inactive mode for supplying power to one or more V2X loads, a net charging/discharging state of a battery of the electric vehicle, a plug-in charging state of the electric vehicle, and a wirelessly charging state of the electric vehicle. In response to the one or more enabling conditions, selectively integrating power output at least one of by the battery of the EV to the offboard loads and at the one or more V2X loads to generate an integrated power output value and converting the integrated power output value to a virtual distance.

16 Claims, 9 Drawing Sheets

Utility
118
EVSE
122
$P_1$
DCFC
110
On-Board Charging Module
126
HV Battery
112
$P_2$
$P_3$
Accessory Loads
132
Inverter
130
$P_4$
Motor/ Gearbox/Diff
114
$P_5$
Wheel(s)
116
Sensors
138
Controller
Virtual Odometer
140
144
Interface (display, input device)
148
Telematics System
160
Interface
Converter
171
175
Converter
Interface
Offboard V2X Components
$P_6$
136
173
175

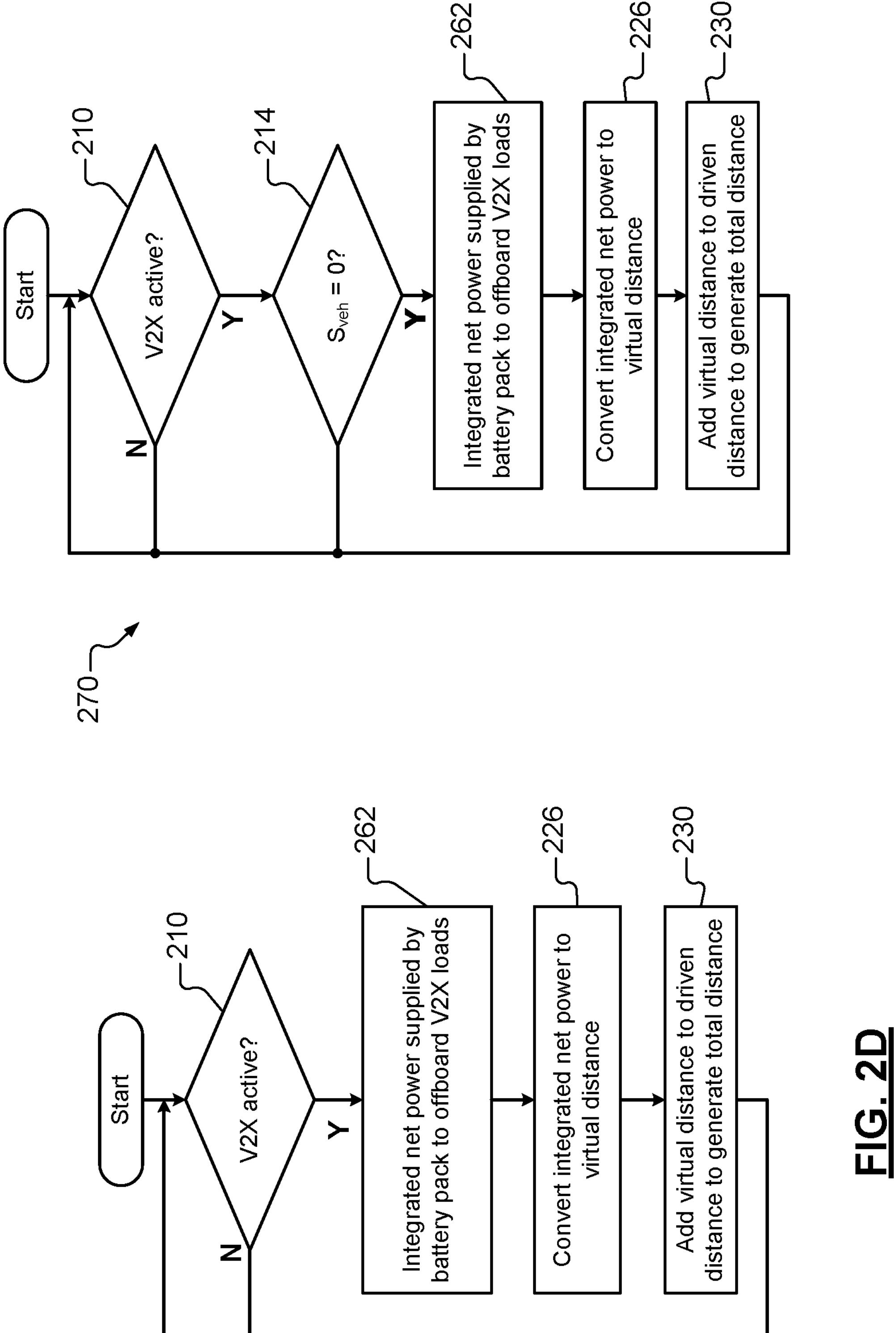
Start
V2X active?
210
Y
N
214
$S_{veh}$ = 0?
Y
Integrated net power supplied by battery pack to offboard V2X loads
262
Convert integrated net power to virtual distance
226
Add virtual distance to driven distance to generate total distance
230
270
FIG. 2E
Start
V2X active?
210
Y
N
Integrated net power supplied by battery pack to offboard V2X loads
262
Convert integrated net power to virtual distance
226
Add virtual distance to driven distance to generate total distance
230
260
FIG. 2D

VIRTUAL ODOMETER FOR ELECTRIC VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric vehicles, and more particularly to a virtual odometer for a vehicle.

Fuel cell and electric vehicles (EVs) include a rechargeable energy storage system (RESS) that powers one or more electric machines that provide propulsion. The RESS may include a battery pack including one or more battery modules each including multiple battery cells. In addition to providing power for propulsion, the RESS may be used to supply power to accessory loads of the EV. The RESS may also be used to power offboard loads when the EV is stationary.

Examples of offboard loads include vehicle to grid (V2G), vehicle to home (V2H), vehicle to vehicle (V2V), vehicle to load (V2L), power take off (PTO), and electronic PTO (collectively vehicle to X or V2X). Supplying V2X loads enables the EV to act as both a power source and a mode of transportation. However, the useful life of the battery pack is affected by both driven miles and usage of the battery pack to power other loads.

SUMMARY

A method for estimating a virtual distance corresponding to power supplied by an electric vehicle (EV) to offboard loads includes monitoring one or more enabling conditions comprising at least one of a speed of the EV, an active/inactive mode for supplying power to one or more V2X loads, a net charging/discharging state of a battery of the electric vehicle, a plug-in charging state of the electric vehicle, and a wirelessly charging state of the electric vehicle. In response to the one or more enabling conditions, selectively integrating power output at least one of by the battery of the EV to the offboard loads and at the one or more V2X loads to generate an integrated power output value and converting the integrated power output value to a virtual distance.

In other features, selectively integrating power output by the battery of the EV is performed when the speed is equal to zero, the net charging/discharging state is net discharging, and the active/inactive mode is active.

In other features, selectively integrating power output by the battery of the EV is performed when the speed is equal to zero, the active/inactive mode is active, the electric vehicle is not plug-in charging, and the electric vehicle is not being wirelessly charged.

In other features, selectively integrating power at the one or more V2X loads is performed when the active/inactive mode for supplying power to the one or more V2X loads is active, and power output to onboard loads of the electric vehicle is not included in the integrated power output value.

In other features, selectively integrating power at the one or more V2X loads is performed when the active/inactive mode for supplying power to the one or more V2X loads is active and the speed is zero, and power output to onboard loads of the electric vehicle is not included in the integrated power output value.

In other features, selectively integrating power at the one or more V2X loads is performed when the active/inactive mode for supplying power to the one or more V2X loads is active, and the integrated power output value includes a predetermined static power output for accessory loads of the electric vehicle.

In other features, selectively integrating power at the one or more V2X loads is performed when the active/inactive mode for supplying power to the one or more V2X loads is active and the speed is zero, and the integrated power output value includes a predetermined static power output for accessory loads of the electric vehicle.

In other features, converting the integrated power output value to a virtual distance includes calculating virtual odometer consumption based on:

$$\frac{\text{Certified Energy Consumption} * \textit{UBE} \text{ Measured at Certification}}{\text{Wall Energy Measured at Certification}},$$

and calculating the virtual distance based on:

$$UF * \frac{\text{Lifetime } V2X \text{ Discharge Energy}}{\text{Virtual Odometer Consumption}},$$

wherein UF is a utility factor.

In other features, converting the integrated power output value to a virtual distance includes calculating virtual odometer consumption based on:

$$\frac{\text{Certified Energy Consumption} * \textit{UBE} \text{ Measured at Certification}}{\text{Wall Energy Measured at Certification}},$$

and wherein i values of the virtual distance are calculated for an $i^{th}$ one of the one or more V2X loads, where i is an integer greater than one, based on:

$$UF_i * \frac{\text{Lifetime } V2X \text{ Discharge Energy}}{\text{Virtual Odometer Consumption}}, \text{ and}$$

$$\text{Virtual Odometer}_{total} = \sum_{i=1}^{N} \text{Virtual Odometer}_i,$$

where $UF_i$ corresponds to a utility factor for an $i^{th}$ one of the one or more V2X loads.

In other features, providing an interface to enable at least one of a customer and a manufacturer to at least one of change an active/inactive mode for the one or more V2X loads and restrict output to the one or more V2X loads.

A virtual odometer for estimating a virtual distance corresponding to power supplied by an electric vehicle (EV) to offboard loads includes one or more sensors monitoring output of a battery of the EV. A controller is configured to communicate with the one or more sensors and to monitor one or more enabling conditions comprising at least one of a speed of the EV, an active/inactive mode for supplying power to one or more V2X loads, a net charging/discharging state of a battery of the electric vehicle, a plug-in charging state of the electric vehicle, and a wirelessly charging state of the electric vehicle. In response to the one or more enabling conditions, the controller is configured to selectively integrate at least one of power output by the battery of the EV and at the one or more V2X loads to the one or more V2X loads to generate an integrated power output value. The controller is configured to convert the integrated power output value to a virtual distance.

In other features, the controller is configured to selectively integrate power output by the battery of the EV to the one or more V2X loads when one of the speed is equal to zero, the net charging/discharging state is net discharging, and the active/inactive mode is active, and the speed is equal to zero, the active/inactive mode is active, the electric vehicle is not plug in charging, and the electric vehicle is not being wirelessly charged.

In other features, the controller is configured to selectively integrate power to the one or more V2X loads when one of the active/inactive mode for supplying power to the one or more V2X loads is active and the active/inactive mode for supplying power to the one or more V2X loads is active and the speed is zero, and the controller is configured to not include power output for accessory loads of the electric vehicle in the integrated power output value.

In other features, the controller is configured to selectively integrate power to the one or more V2X loads when the active/inactive mode for supplying power to the one or more V2X loads is active, and the controller is configured to include a predetermined static power output corresponding to accessory loads of the electric vehicle in the integrated power output value.

In other features, the controller is configured to selectively integrate power at the one or more V2X loads when the active/inactive mode for supplying power to the one or more V2X loads is active and the speed is zero, and the controller is configured to include a predetermined static power output corresponding to accessory loads of the electric vehicle in the integrated power output value.

In other features, the controller is configured to convert the integrated power output value to a virtual distance by calculating virtual odometer consumption based on:

$$\frac{\text{Certified Energy Consumption} * UBE \text{ Measured at Certification}}{\text{Wall Energy Measured at Certification}},$$

and calculating the virtual distance based on:

$$UF * \frac{\text{Lifetime } V2X \text{ Discharge Energy}}{\text{Virtual Odometer Consumption}},$$

wherein UF is a utility factor.

In other features, the controller is configured to convert the integrated power output value to a virtual distance by calculating virtual odometer consumption based on:

$$\frac{\text{Certified Energy Consumption} * UBE \text{ Measured at Certification}}{\text{Wall Energy Measured at Certification}},$$

and wherein i values of the virtual distance are calculated for an $i^{th}$ one of the one or more V2X loads, where i is an integer greater than one, based on:

$$UF_i * \frac{\text{Lifetime } V2X \text{ Discharge Energy}}{\text{Virtual Odometer Consumption}},$$

and $$\text{Virtual Odometer}_{total} = \sum_{i=1}^{N} \text{Virtual Odometer}_i,$$

where $UF_i$ corresponds to a utility factor for an $i^{th}$ one of the one or more V2X loads.

In other features, an interface to enable at least one of a customer and a manufacturer to at least one of change an active/inactive mode for the one or more V2X loads and restrict output to the one or more V2X loads.

A method for estimating a virtual distance corresponding to power supplied by an electric vehicle (EV) to offboard loads includes monitoring one or more enabling conditions comprising at least one of a speed of the EV and an active/inactive mode for supplying power to one or more V2X loads. In response to the one or more enabling conditions, selectively converting run time of a respective one of the one or more V2X loads to a virtual distance, and adding the virtual distance to a total virtual distance.

In other features, the method includes providing an interface to enable at least one of a customer and a manufacturer to at least one of change an active/inactive mode for the one or more V2X loads and restrict output to the one or more V2X loads.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A to 2I are examples of methods for estimating a virtual distance corresponding to power supplied to V2X loads according to the present disclosure;

In the drawings, reference numbers may be reused to identify similar and/or identical elements.

DETAILED DESCRIPTION

Figure 1:
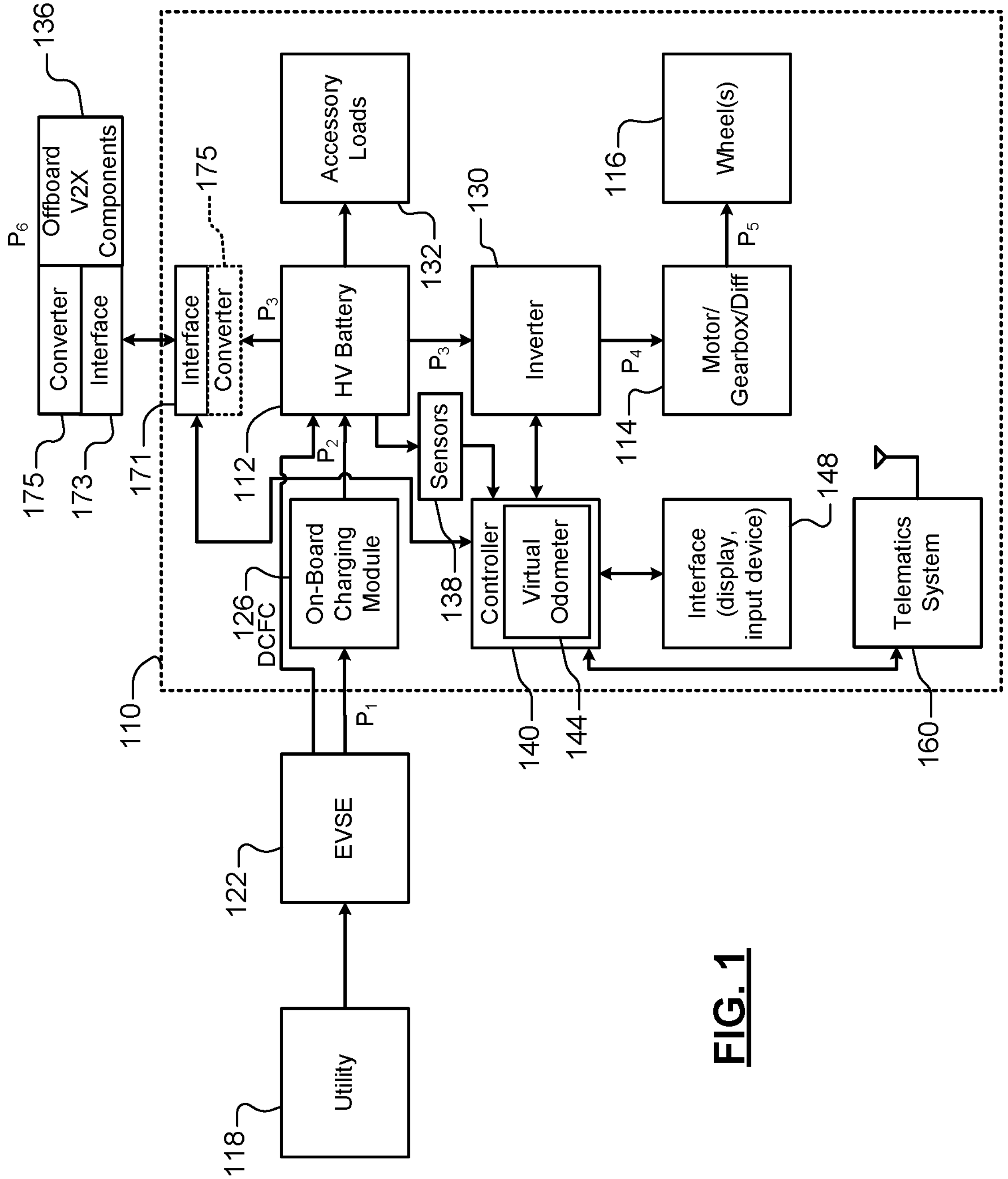
FIG. 1 is a functional block diagram of a system including an electric vehicle including a virtual odometer, electric vehicle supply equipment, and V2X loads according to the present disclosure.

As used herein, vehicle to X (V2X) refers to the transfer of energy from the EV to an offboard device and/or for offboard use while the EV is stationary. Examples of V2X include vehicle to grid (V2G), vehicle to home (V2H), vehicle to vehicle (V2V), vehicle to load (V2L), power take off (PTO), electronic PTO, etc. V2X enables the EV to act as both a power source and a mode of transportation.

EV owners may be incentivized in various ways to enable V2G. For example, EV owners may sell power stored in the RESS to a utility (V2G) or another EV (V2V). V2G has been identified as a key tool for achieving decarbonization and electric vehicle adoption goals.

However, powering V2X loads causes wear of the battery pack that is comparable to propulsion use. In addition, some jurisdictions may require EVs to provide a customer-facing state of health (SOH) metric to be calculated and accessible to the EV owner. Some jurisdictions may also require EV warranties to be tied to a predetermined SOH at a predetermined mileage and/or vehicle age.

For example, some jurisdictions may require the battery pack to be free from defects in materials and workmanship which cause the battery SOH to deteriorate to less than a predetermined percentage during a warranty period or within a predetermined distance travelled. Usage of the battery pack to power V2X loads causes wear of the battery pack. Therefore, supplying power to V2X loads needs to be considered by these laws and/or manufacturer warranties.

When customers are considering purchasing a used EV, it will be important for the customer to consider and understand both the driven distance and usage of the battery pack to power V2X loads. All other things being equal (including driven miles), the customer would likely be better off purchasing a vehicle will less usage powering V2X loads. If the EV does not track usage in this manner, the customer will be unable to assess the remaining life of the battery pack and may make the wrong selection, which will reduce confidence when purchasing used EVs.

The virtual odometer for an EV according to the present disclosure integrates power supplied by the battery pack to the V2X loads and then estimates a virtual distance as a parameter that can be understood by most customers to account for the total integrated power or energy supplied by the EV as will be described further below. In some examples, the virtual odometer estimates and/or displays a virtual distance corresponding to a distance that the EV would travel if the power had been used for propulsion and/or a total distance for the EV that is equal to a driven distance plus the virtual distance. The virtual distance and/or the total distance are used as a metric for warranty, maintenance, and/or other uses that will be described further below.

More particularly, when the EV speed is zero and/or V2X is active, the virtual odometer integrates net power output by the battery pack while net discharge from the battery pack is occurring. Then, integrated net power is converted to a virtual distance. In some examples, the same conversion of km/kWh is used for driving and V2X. In other examples, a conversion factor is used to adjust a weight of the virtual distance.

Referring now to FIG. 1, an electric vehicle 110 includes a battery pack 112 such as a high voltage (HV) battery and a powertrain 114 including an electric motor, a gearbox, and/or a differential to propel one or more wheels 116 of the electric vehicle 110. A utility 118 or other power source supplies power to electric vehicle supply equipment (EVSE) 122. In some examples, the EVSE 122 supplies power from the utility 118 to an on-board charging module (OBCM) 126 that controls charging of the battery pack 112. In some examples, DC fast charging (DCFC) is used and the OBCM 126 is bypassed.

During driving, the battery pack 112 supplies power through a power inverter module 130 to the powertrain 114 to propel one or more wheels 116 of the EV 110. The battery pack 112 also supplies power to onboard accessory loads 132. Some vehicles can also supply power to offboard V2X components 136 such as vehicle to grid (V2G), vehicle to home (V2H), vehicle to vehicle (V2V), vehicle to load (V2L), a power take off (PTO), and an electronic PTO. V2X enables the EV to act as both a power source and a mode of transportation.

One or more sensors 138 such as current and/or voltage sensors sense power output by the battery pack to the powertrain 114, accessory loads, and/or offboard V2X loads. In some examples, the controller communicates with or is part of a battery management module that monitors and controls the battery pack 112. A controller 140 receives output(s) of the one or more sensors 138. The controller 140 includes a virtual odometer 144 to calculate a virtual distance and/or a total distance.

An interface 148 including a display and input device (such as buttons or touchscreen) such as a dashboard display or infotainment display displays the virtual odometer value identifying one or more of the total distance, the driven distance, and/or the virtual distance. The interface 148 allows a customer to change settings controlling power supplied to the V2X loads as will be described further below. Tracking both the virtual distance and the driven distance allows a user and/or the manufacturer to selectively inactivate, restrict, or disable the EV from supplying power to V2X loads. A telematics system 160 may be used to wirelessly communicate with a remote server to exchange information such as the virtual distance, the total distance, and/or the driven distance with a manufacturer and/or to receive setting changes, restrictions, and/or recommendations from the manufacturer.

In some examples, restricting power output to V2X when the battery is degrading faster than its anticipated degradation glideslope and/or calculations or customer input estimates that an energy reserve is needed for future propulsion needs.

In some examples, the electric vehicle 110 includes an interface 171 configured to exchange information with an interface 173 of the offboard V2X components 136. In some examples, a power converter 175 converts power output by the battery pack 112 for use by the offboard V2X components 136. In some examples, the power converter 175 is arranged on the vehicle side as shown. In some examples, the exchanged information includes an identification of a type of V2X load, power requirements, and/or other information. The controller 140 and the interface 148 are configured to set an active/inactive state for supplying power from the battery pack 112 to the various types of V2X loads and to set limits on power supplied within a predetermined period (e.g., one or more hours, days, weeks, months, years, or other period). In some examples, the manufacturer can override the customer settings based on the virtual odometer and/or provide recommendations that can be used as a default or selected by the customer.

As can be appreciated, 1 kWh at the wall or utility does not equal 1 kWh supplied by the battery pack 112. At each stage, losses occur. For example, if P1 is equal to 1 kWh at the output of the EVSE 122, P2 at the output of the on-board charging module 126 (e.g., ~93% efficient) is less than P1 (e.g., 0.93 kWh). P3 at the output of the battery pack 112

(e.g., ~95% efficient) is less than P2 (e.g., 0.88 kWh). P4 at the output of the power inverter module 130 (e.g., ~97% efficient) is less than P3 (e.g., 0.86 kWh). P5 at the output of the powertrain 114 (e.g., ~97% efficient) is less than P4 (e.g., 0.79 kWh). P6 at the offboard V2X components 136 (~89% to 98% efficient) is also less than P3 (e.g., 0.79 kWh to 0.87 kWh).

Therefore, because of the relative simplicity, the efficiency of power supplied to the offboard V2X components 136 is typically greater than the efficiency of propulsion. In some examples, the calculations are simplified by assigning the same km/kWh to powering the V2X loads and propulsion. This approach provides a slight benefit to customers who opt to supply power to V2X components since the virtual distance will increase slightly slower than it otherwise would if the efficiency differences of V2X and propulsion were considered. In other examples, a conversion factor is used to equalize power supplied to V2X loads and propulsion on a collective or individual basis.

Figure 2A:
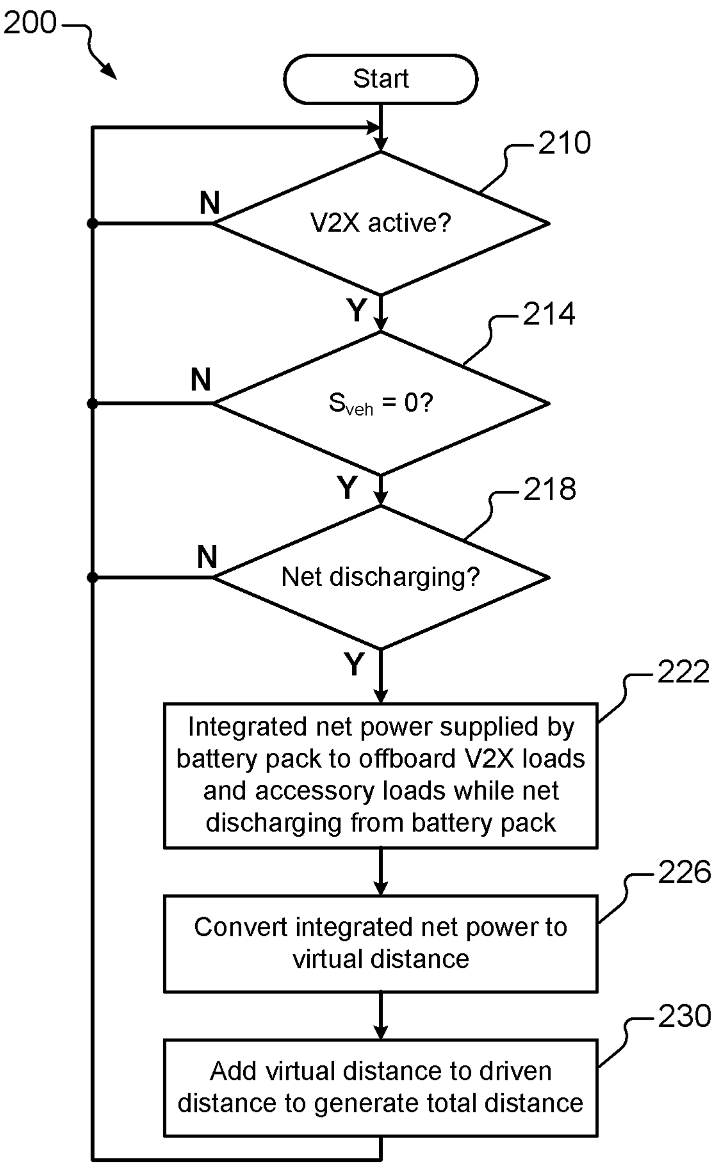

Referring now to FIGS. 2A to 2I, various methods for determining the virtual odometer values are shown. In FIG. 2A, a method 200 for providing a virtual odometer is shown. At 210, the method determines whether supplying power to V2X loads is active. If supplying power to V2X loads is active as determined at 210, the method determines whether the EV speed is zero at 214. At 218, the method determines whether the battery pack is in a net discharge state (supplying more power than it is receiving). As can be appreciated, charging may be performed via a direct connection to the EV and/or using wireless charging. The EV may supply offboard V2X loads and/or onboard accessory loads. Examples of onboard accessory loads include 12V/48V maintenance, thermal conditioning of components on the vehicle, HVAC in cabin, etc.

If 218 is true, the method integrates net power supplied by the battery pack as measured at the battery pack. The loads include offboard V2X loads and/or accessory loads. At 226, the method converts the integrated net power into a virtual distance as will be described further below. At 230, the method optionally adds the virtual distance to the prior virtual distance to generate an updated total virtual distance and/or adds the virtual distance to the prior total distance (including both virtual and driven distances).

In 222, all loads on battery pack including any plug-in charge or wireless charge additions) are included. While net discharging, all loads on the battery pack (measuring voltage and current at the battery pack) are included. For example, if the EV is plug-in charging at 10 kW but outputting 25 kW to ePTO and 5 kW to accessory loads, the net will be 20 kW discharge and will be considered in the integrated power total in 226. If the EV starts net charging (example: plug in charge at 50 kW, ePTO at 25 kw, accessory loads at 5 kW), the V2X energy calculation is paused.

Figure 2C:
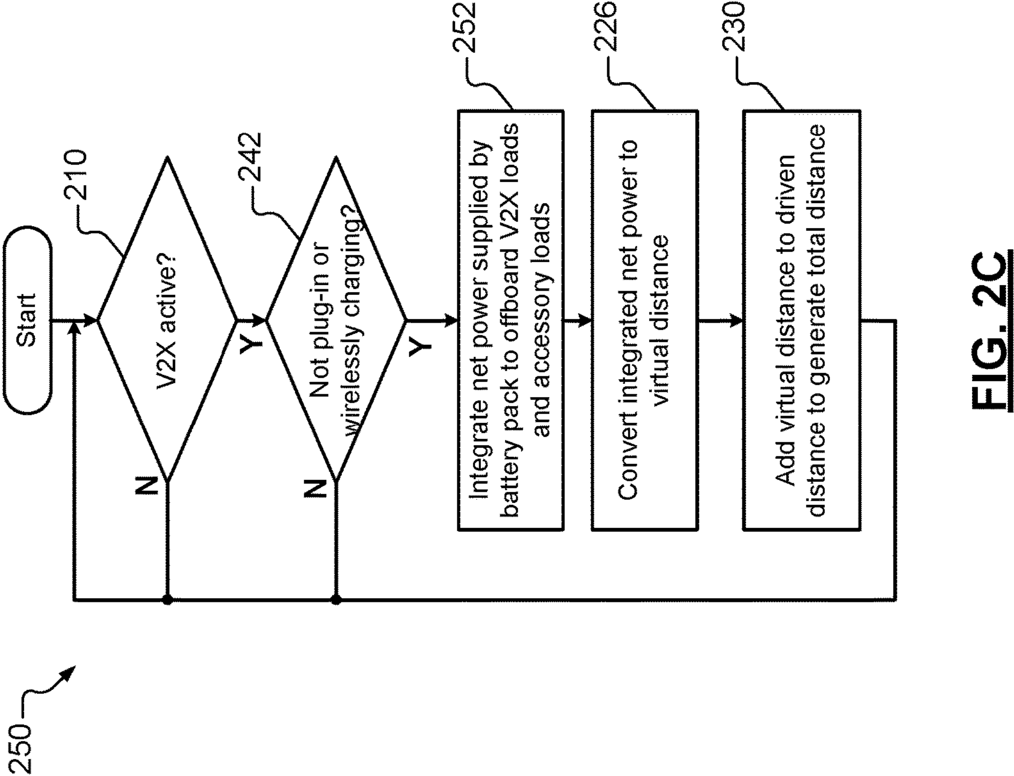
Figure 2B:
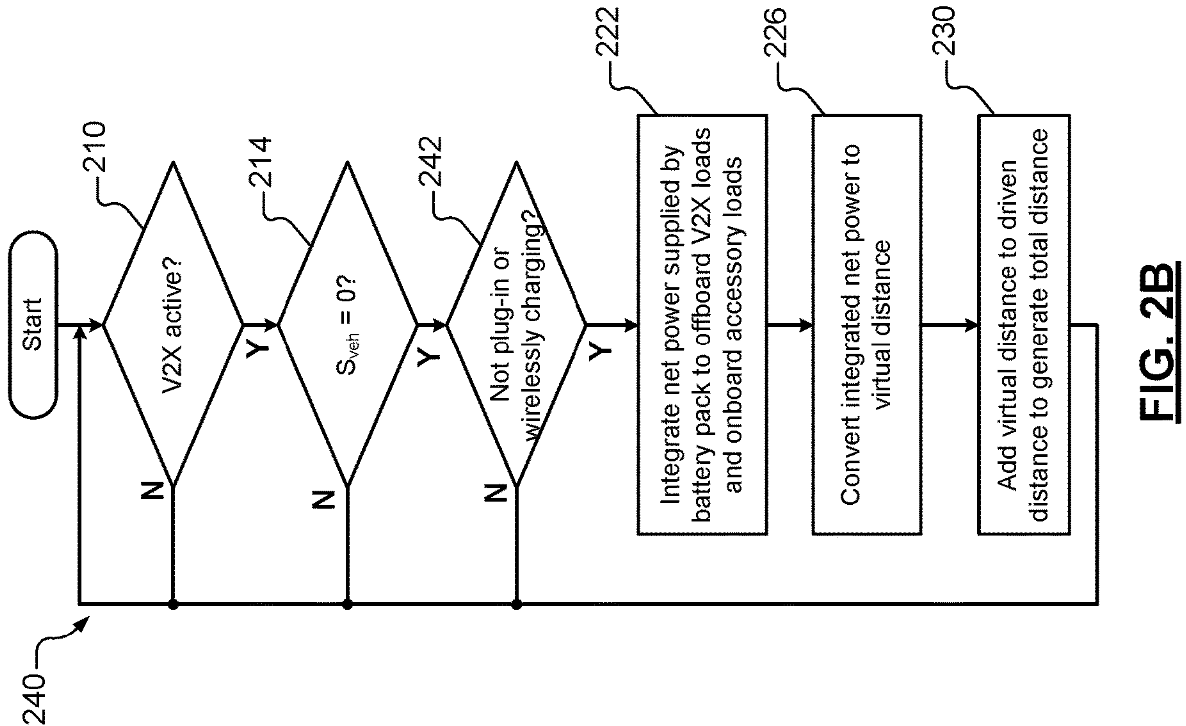

In FIG. 2B, the method integrates net power supplied by the battery pack as measured at the battery pack except when the battery pack is plug-in or wirelessly charging. A method 240 determines whether V2X is active and vehicle speed is zero at 210 and 214. At 242, the method determines whether the EV is not plug-in or wirelessly charging. If 210, 214 and 242 are true, the method continues with 222, 226 and 230.

In FIG. 2C, the method integrates net power supplied by the battery pack as measured at the battery pack except when the battery pack is plug-in or wirelessly charging. A method 250 determines whether V2X is active at 210 and whether the EV is not plug-in or wirelessly charging at 242. If 210 and 242 are true, the method integrates net power supplied by the battery pack to offboard loads and accessory loads at 252 prior to initiating 226 and 230.

In FIG. 2D, power output by the battery pack is measured at the interface to the V2X components (therefore power supplied to accessory loads is not included). A method 260 determines whether V2X is active at 210. If 210 is true, the method 260 integrates net power supplied to V2X loads at 262. After performing 262, the method 260 performs 226 and 230.

In FIG. 2E, power output by the battery pack is measured at the interface to the V2X components (therefore power supplied to accessory loads is not included). A method 270 determines whether V2X is active at 210 and vehicle speed is zero at 214. If 210 and 214 are true, the method 270 integrates net power supplied to V2X loads at 262. After performing 262, the method 270 performs 226 and 230.

Figure 2G:
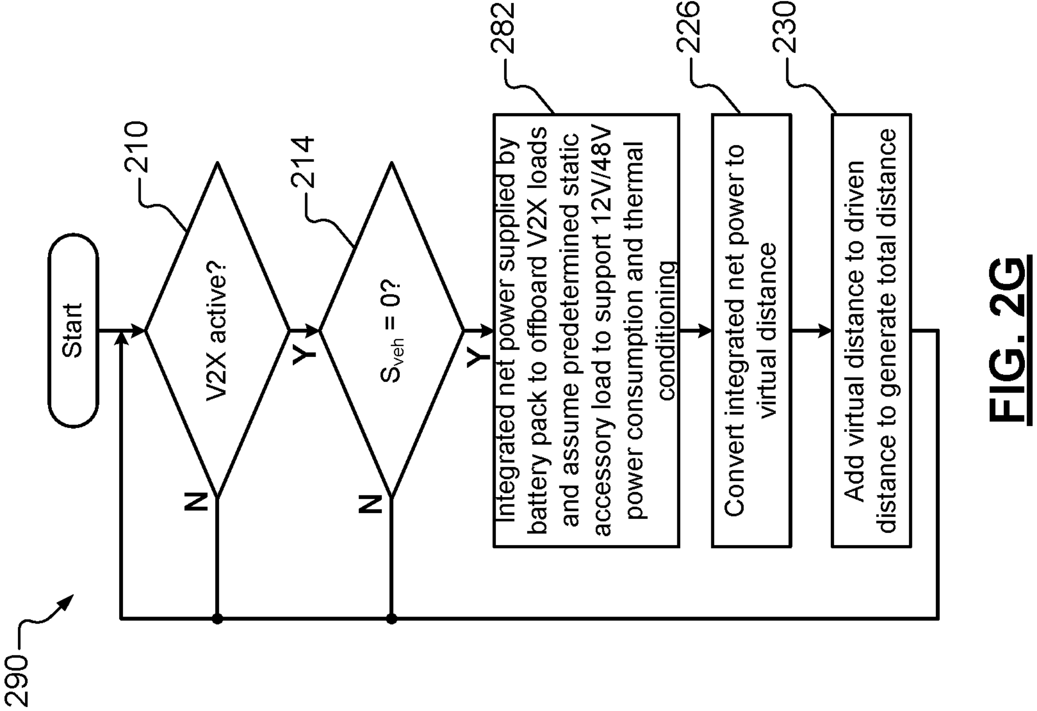
Figure 2F:
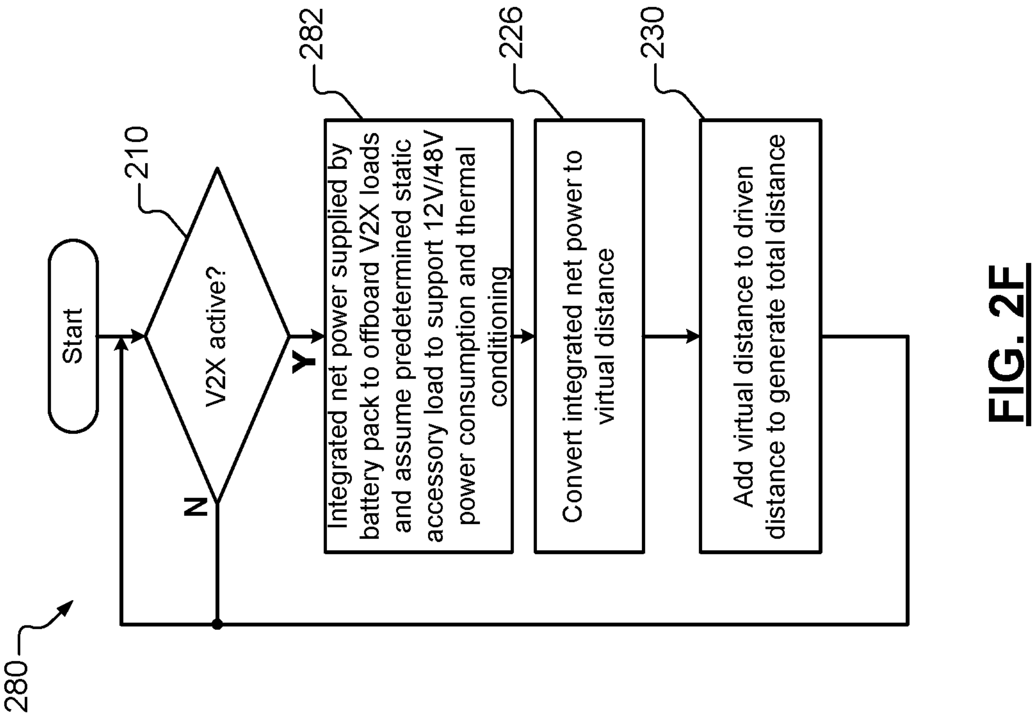

In FIG. 2F, power output by the battery pack is measured at the interface to the V2X components and a predetermined static accessory load is added but not directly measured. A method 280 determines whether V2X is active at 210. If 210 is true, the method 280 integrates net power supplied to V2X loads and uses a predetermined or assumed static accessory load to support 12V/48V (or other accessory voltage level) power consumption and thermal conditioning at 282. After performing 282, the method 280 performs 226 and 230.

In FIG. 2G, power output by the battery pack is measured at the interface to the V2X components and a predetermined static accessory load is added but not directly measured. A method 290 determines whether V2X is active at 210 and vehicle speed is zero at 214. If 210 and 214 are true, the method 290 integrates net power supplied to V2X loads and assumes a predetermined or assumed static accessory load to support 12V (or other accessory voltage level) power consumption and thermal conditioning at 282. After performing 282, the method 280 performs 226 and 230.

Figure 2I:
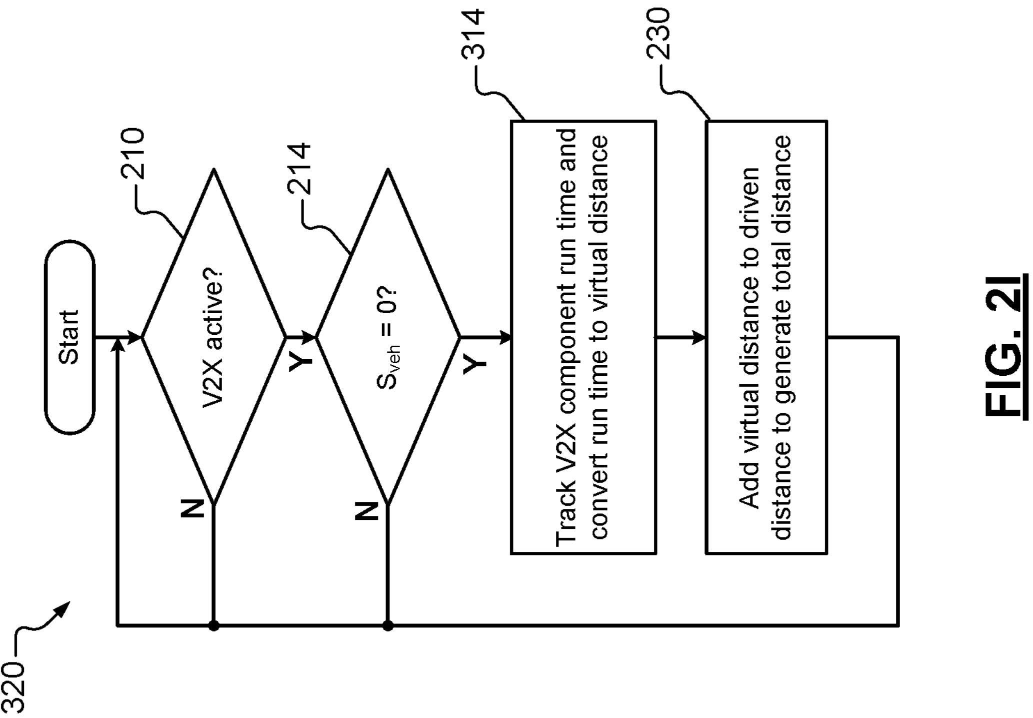
Figure 2H:
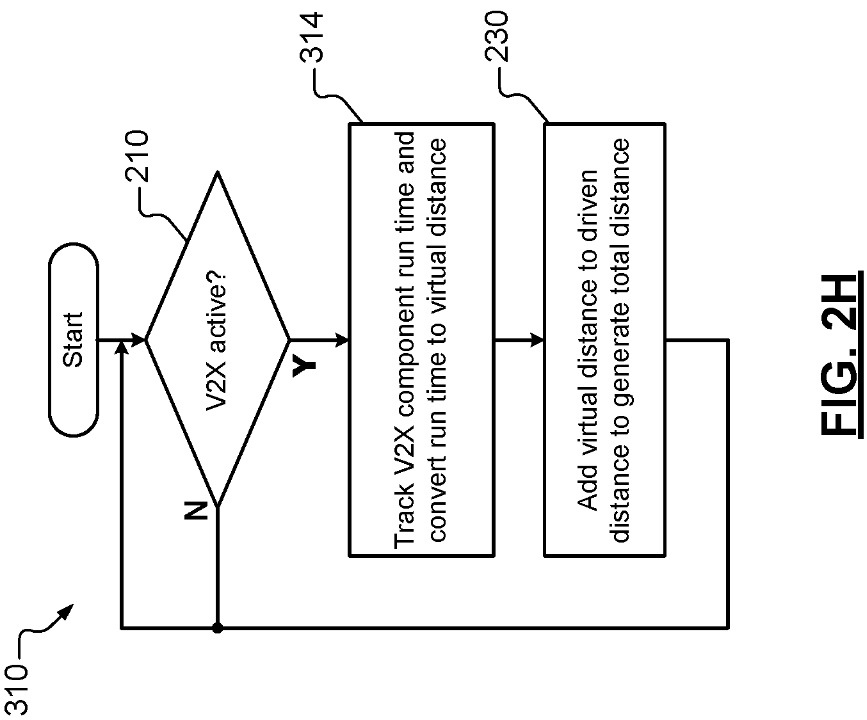

Referring now to FIG. 2H, a method 310 determines whether V2X is active at 210. If 210 is true, the method continues at 314 and tracks run time for each of the V2X components and converts the corresponding run times to corresponding virtual distances. For example, 1 hour of runtime for a $V2X_1$ component corresponds to $X_i$ virtual distance. For example, 1 hour of runtime for a first $V2X_1$ component corresponds to 25 kilometers. For example, 1 hour of runtime for a second $V2X_2$ component corresponds to 52 kilometers. For example, 1 hour of runtime for a third $V2X_3$ component corresponds to 99 kilometers and so on. The actual run times are multiplied by the distance per hour of runtime to determine a corresponding virtual distance.

Referring now to FIG. 2I, a method 310 determines whether V2X is active at 210 and vehicle speed is zero at 214. If 210 and 214 are true, the method continues at 314 and tracks run time for each of the V2X components and translates the corresponding run times to corresponding virtual distances. The virtual distances for each of the V2X components is summed to generate a total virtual distance.

Figure 3:
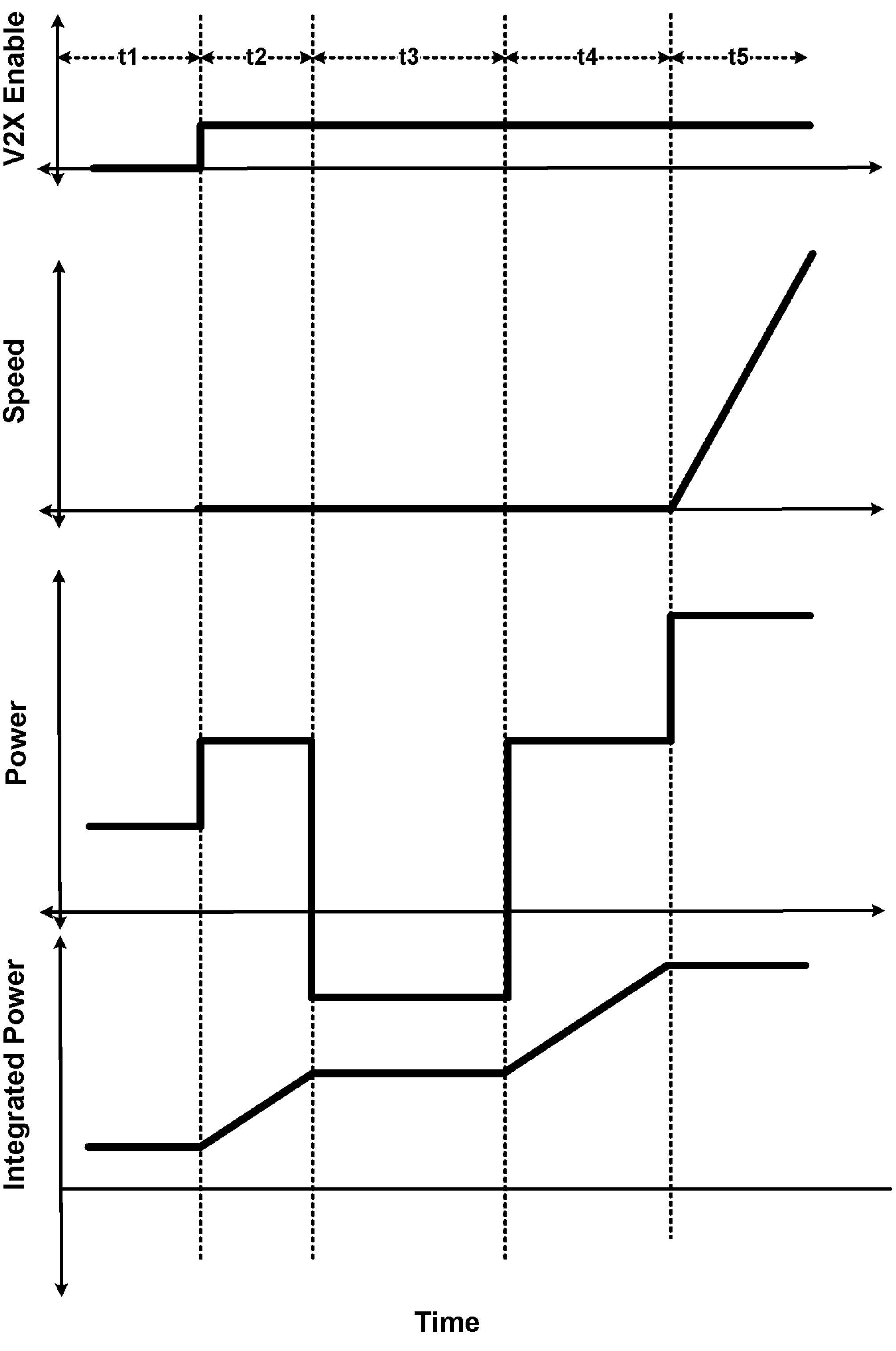
FIG. 3 are graphs illustrating an example calculation of integrated net power while supplying V2X loads according to the present disclosure.

Referring now to FIG. 3, an example illustrating integration of virtual power supplied to V2X loads is shown. As shown in FIG. 3, the x-axis is time, and the y-axis for each plot is either a V2X enable signal, speed, power, or integrated power. During a first period t1, supplying power to V2X loads is inactive and the integrated power for V2X loads remains constant. During a second period t2 through fifth periods t5, supplying power to V2X loads is active. In the second period t2, the EV speed is zero and the power output by the battery pack to V2X loads is integrated and integrated power increases while the battery pack is net discharging. During a third period t3, the battery pack is net charging and therefore power output by the battery pack is not integrated (e.g., integrated power remains constant). During a fourth period t4, the battery pack is net discharging and the power output by the battery pack is integrated and integrated power increases. During the fifth period t5, the EV speed is greater than zero and therefore the power output of the battery pack is not integrated.

Figure 4:
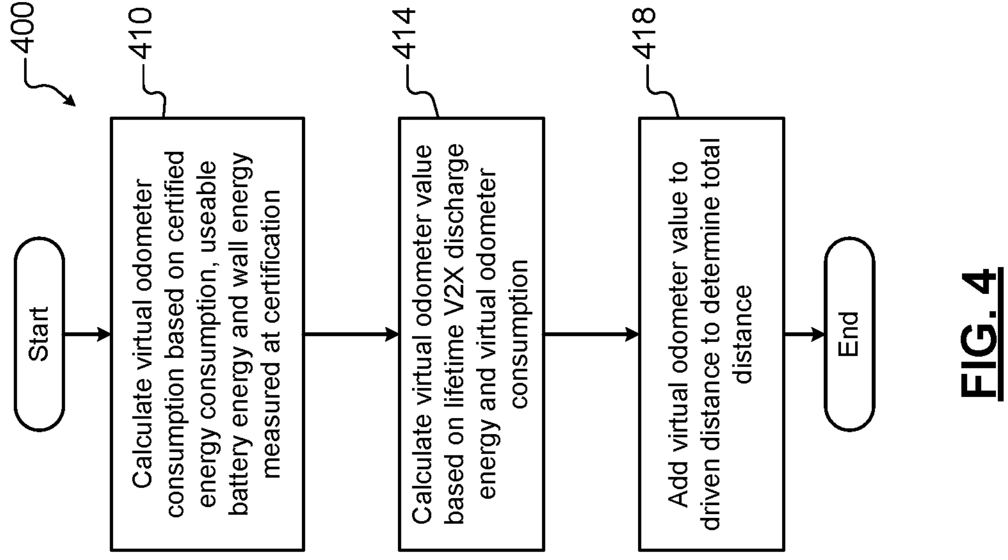
FIG. 4 is an example of a method for estimating virtual distance according to the present disclosure.

Referring now to FIG. 4, a method 400 for calculating a virtual odometer is shown. At 410, the method calculates virtual odometer consumption based on certified energy consumption, useable battery energy, and wall energy measured at certification, which are values that are determined during certification. In some examples, the virtual odometer consumption (kilowatt hours per kilometer (kWh/km)) is calculated as follows:

$$\frac{\text{Certified Energy Consumption} * UBE \text{ Measured at Certification}}{\text{Wall Energy Measured at Certification}}$$

Certified energy consumption, useable battery energy (UBE), and wall energy measured at certification are known values that are determined at the time of certification of the EV. Using these values helps to ensure a more level playing field across manufacturers and allows comparison shopping to occur by using publicly available information. Furthermore, vehicles with lower certified energy consumption will have lower virtual distance for the same integrated V2X power and vice versa.

At 414, the method calculates a virtual odometer value based on lifetime V2X discharge energy and virtual odometer consumption. In some examples, the virtual odometer value (km) is calculated as follows:

$$UF * \frac{\text{Lifetime } V2X \text{ Discharge Energy}}{\text{Virtual Odometer Consumption}}$$

In some examples, a utility factor (UF) is used. The UF can be set to 1 or another value to adjust the calculation. The utility factor is a function of historical V2X power. Higher power is more damaging and would correspond to higher UF values (and vice versa). For example, utility factor may be generated by a calibration table, a continuous function, and/or a discrete function in response to lifetime average V2X power load.

At 418, the virtual odometer value is optionally added to the driven distance to generate the total distance for the EV.

In other examples, i values of the virtual odometer value (km) are calculated for i different V2X loads (where i is an integer) as follows:

$$UF_i * \frac{\text{Lifetime } V2X \text{ Discharge Energy}}{\text{Virtual Odometer Consumption}}$$

In other words, each of the values of i corresponds to a V2X application such as V2G, V2V, V2L, etc. and there are a total of N V2X loads. Then, the N virtual odometer totals are summed to generate the total virtual odometer as follows:

$$\text{Virtual Odometer}_{total} = \sum_{i=1}^{N} \text{Virtual Odometer}_i$$

Figure 5:
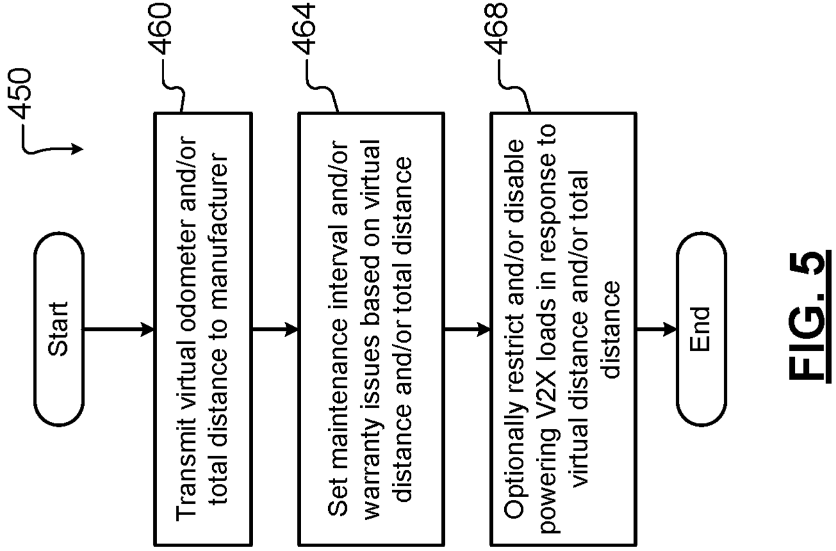
FIG. 5 is an example of a method for using the virtual distance to manage warranty, service and/or powering of V2X loads according to the present disclosure.

Referring now to FIG. 5, a method 450 for using the virtual distance and/or the total distance is shown. At 460, the virtual odometer and/or total distance is transmitted via the telematics system to the manufacturer. At 464, the maintenance interval is set based on the virtual distance and/or the total distance. For example, maintenance may include changing coolant used to cool the battery pack. At 468, the manufacturer may optionally restrict or disable powering V2X loads in response to the virtual distance and/or the total distance. The manufacturer may optionally restrict or disable powering V2X loads based on current battery state of health (SOH), a projected SOH at a future odometer value, or a projected SOH at a future point in time. The manufacturer or customer may also optionally restrict or disable powering V2X loads to reserve a certain amount of energy for propulsion. (For example: construction worker who needs to drive home from a job site needs some reserved energy to make it home).

If the virtual distance and/or the total distance is too high, the manufacturer can suggest maintenance. If the virtual distance and/or the total distance is too high, the manufacturer can send an electronic message offering an extended warranty and/or send a prerecorded message or contact the customer directly via the telematics system or through another communications channel. The manufacturer can limit V2X capability by restricting peak power or current available for supplying V2X loads, restrict all V2X functionality, restricting supplying power to one or more types of V2X loads (e.g., V2L, V2V, V2G, . . . ), display warnings to the customer on wear and tear from V2X, limit peak DCFC current to help offset excess wear and tear from V2X, limit peak propulsion current to help offset the excess wear and tear from usage powering V2X loads, limit peak AC charging current to help offset the excess wear and tear from usage powering V2X loads.

In other examples, the manufacturer may send a message to the owner to offer an extended warranty for additional payment to allow V2X to continue. In still other examples, the manufacturer may send messages to the owner indicating that V2X is counted against the warranty.

The customer is informed by virtual odometer metrics displayed on the center stack or instrument panel. By calculating the virtual odometer, more appropriate resale values will be used for used EVs. This, in turn, will lead to higher consumer confidence when buying a used vehicle by having a comprehensive estimate of past propulsion and V2X usage. In some examples, warranty can be tied to the virtual odometer value using units that are more familiar to customers (e.g., odometer distance such as miles or kilometers). In addition, there is less risk to manufacturers when V2X usage is considered in warranty situations. Lowering the risk will increase the likelihood of adoption of V2X capability across the industry. This will also prevent the need for manufacturers to overdesign for worst case or excessive V2X usage (with a corresponding increase in vehicle cost).

Figure 6:
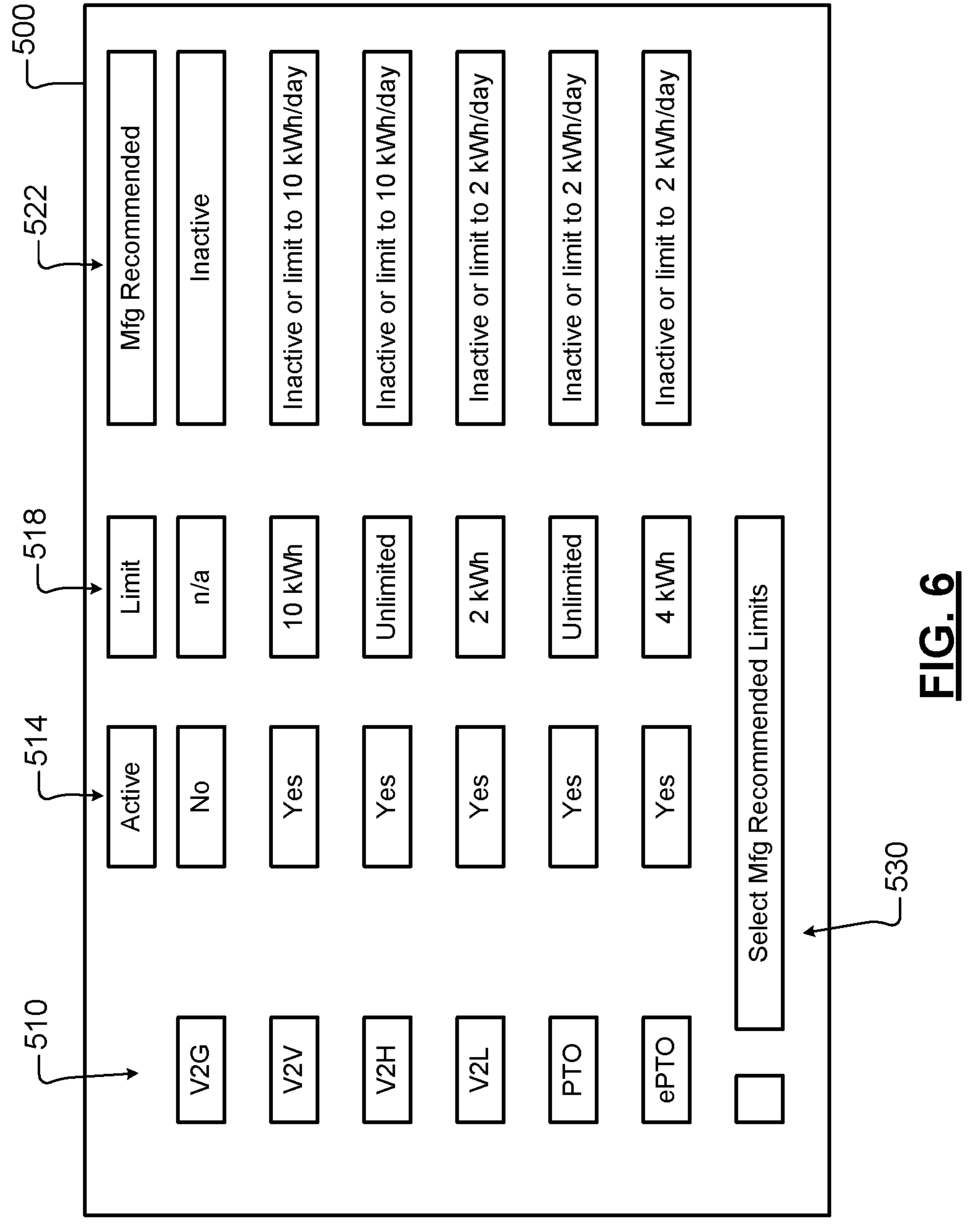
FIG. 6 illustrates an example of an interface for controlling power supplied to various V2X loads according to the present disclosure.

Referring now to FIG. 6, a display interface 500 that can be accessed by the customer via the infotainment system, instrument panel or other device for setting an active/inactive state for supplying power to a V2X load is shown. The display interface 500 allows the customer to select and adjust the V2X loads 510, active/inactive states 514 for the V2X loads 510, and/or daily power limits 518 for each of the V2X loads. In some examples, the manufacturer's recommended limits for each of the V2X loads at 522 are provided. In some examples, a customer can select the manufacturer's recommended daily limits using an input 530 such as a check box. Furthermore, the manufacturer can override a user selection by disabling the selectable active/inactive states 514 for the V2X loads 510 and/or set other daily power limits for each of the V2X loads remotely based on SOH, future estimated SOH, the total distance, the virtual distance, and/or the driven miles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for estimating a virtual distance corresponding to power supplied by an electric vehicle (EV) to offboard loads, comprising:

monitoring one or more enabling conditions comprising at least one of:

a speed of the EV;

an active/inactive mode for supplying power to one or more V2X loads;

a net charging/discharging state of a battery of the electric vehicle;

a plug-in charging state of the electric vehicle; and a wirelessly charging state of the electric vehicle;

in response to the one or more enabling conditions, selectively integrating power output by at least one of by the battery of the EV to the offboard loads and at least one or more of the V2X loads to generate an integrated power output value;

converting the integrated power output value to a virtual distance; and changing from an active mode setting to an inactive mode setting to restrict output from the battery to the one or more V2X loads according to the virtual distance, wherein converting the integrated power output value to a virtual distance includes:

calculating virtual odometer consumption based on:

$$\frac{\text{Certified Energy Consumption} * UBE \text{ Measured at Certification}}{\text{Wall Energy Measured at Certification}},$$

and calculating the virtual distance based on:

$$UF * \frac{\text{Lifetime } V2X \text{ Discharge Energy}}{\text{Virtual Odometer Consumption}},$$

wherein UBE is useable battery energy, and UF is a utility factor.

2. The method of claim 1, wherein selectively integrating power output by the battery of the EV is performed when the speed is equal to zero, the net charging/discharging state is net discharging, and the active/inactive mode is active.

3. The method of claim 1, wherein selectively integrating power output by the battery of the EV is performed when the speed is equal to zero, the active/inactive mode is active, the electric vehicle is not plug-in charging, and the electric vehicle is not being wirelessly charged.

4. The method of claim 1, wherein:

selectively integrating power at the one or more V2X loads is performed when the active/inactive mode for supplying power to the one or more V2X loads is active, and power output to onboard loads of the electric vehicle is not included in the integrated power output value.

5. The method of claim 1, wherein:

selectively integrating power at the one or more V2X loads is performed when the active/inactive mode for supplying power to the one or more V2X loads is active and the speed is zero, and power output to onboard loads of the electric vehicle is not included in the integrated power output value.

6. The method of claim 1, wherein:

selectively integrating power at the one or more V2X loads is performed when the active/inactive mode for supplying power to the one or more V2X loads is active, and the integrated power output value includes a predetermined static power output for accessory loads of the electric vehicle.

7. The method of claim 1, wherein:

selectively integrating power at the one or more V2X loads is performed when the active/inactive mode for supplying power to the one or more V2X loads is active and the speed is zero, and the integrated power output value includes a predetermined static power output for accessory loads of the electric vehicle.

8. The method of claim 1, wherein converting the integrated power output value to a virtual distance includes:

calculating virtual odometer consumption based on:

$$\frac{\text{Certified Energy Consumption} * UBE \text{ Measured at Certification}}{\text{Wall Energy Measured at Certification}},$$

and wherein i values of the virtual distance are calculated for an $i^{th}$ one of the one or more V2X loads, where i is an integer greater than one, based on:

$$UF_i * \frac{\text{Lifetime } V2X \text{ Discharge Energy}}{\text{Virtual Odometer Consumption}},$$

and $$\text{Virtual Odometer}_{total} = \sum_{i=1}^{N} \text{Virtual Odometer}_i,$$

where $UF_i$ corresponds to a utility factor for an $i^{th}$ one of the one or more V2X loads.

9. The method of claim 1, further comprising providing an interface to enable at least one of a customer and a manufacturer to at least one of:

change an active/inactive mode for the one or more V2X loads; and restrict output to the one or more V2X loads.

10. A virtual odometer for estimating a virtual distance corresponding to power supplied by an electric vehicle (EV) to offboard loads, comprising:

one or more sensors monitoring output of a battery of the EV; and a controller configured to communicate with the one or more sensors and to monitor one or more enabling conditions comprising at least one of:

a speed of the EV;

an active/inactive mode for supplying power to one or more V2X loads;

a net charging/discharging state of a battery of the electric vehicle;

a plug-in charging state of the electric vehicle; and
a wirelessly charging state of the electric vehicle, in response to the one or more enabling conditions, the controller is configured to selectively integrate at least one of power output by the battery of the EV and at least one or more V2X loads to generate an integrated power output value, the controller is configured to convert the integrated power output value to a virtual distance, and the controller is configured to change from an active mode setting to an inactive mode setting to restrict output from the battery to the one or more V2X loads according to the virtual distance, wherein the controller is configured to convert the integrated power output value to a virtual distance by:

calculating virtual odometer consumption based on:

$$\frac{\text{Certified Energy Consumption} * UBE \text{ Measured at Certification}}{\text{Wall Energy Measured at Certification}},$$

and calculating the virtual distance based on:

$$UF * \frac{\text{Lifetime } V2X \text{ Discharge Energy}}{\text{Virtual Odometer Consumption}},$$

wherein UBE is useable battery energy, and UF is a utility factor.

11. The virtual odometer of claim 10, wherein the controller is configured to selectively integrate power output by the battery of the EV to the one or more V2X loads when one of:

the speed is equal to zero, the net charging/discharging state is net discharging, and the active/inactive mode is active; and the speed is equal to zero, the active/inactive mode is active, the electric vehicle is not plug in charging, and the electric vehicle is not being wirelessly charged.

12. The virtual odometer of claim 10, wherein:

the controller is configured to selectively integrate power to the one or more V2X loads when one of:

the active/inactive mode for supplying power to the one or more V2X loads is active; and the active/inactive mode for supplying power to the one or more V2X loads is active and the speed is zero, and the controller is configured to not include power output for accessory loads of the electric vehicle in the integrated power output value.

13. The virtual odometer of claim 10, wherein:

the controller is configured to selectively integrate power to the one or more V2X loads when the active/inactive mode for supplying power to the one or more V2X loads is active, and the controller is configured to include a predetermined static power output corresponding to accessory loads of the electric vehicle in the integrated power output value.

14. The virtual odometer of claim 10, wherein:

the controller is configured to selectively integrate power at the one or more V2X loads when the active/inactive mode for supplying power to the one or more V2X loads is active and the speed is zero, and the controller is configured to include a predetermined static power output corresponding to accessory loads of the electric vehicle in the integrated power output value.

15. The virtual odometer of claim 10, wherein the controller is configured to convert the integrated power output value to a virtual distance by:

calculating virtual odometer consumption based on:

$$\frac{\text{Certified Energy Consumption} * UBE \text{ Measured at Certification}}{\text{Wall Energy Measured at Certification}},$$

and wherein i values of the virtual distance are calculated for an $i^{th}$ one of the one or more V2X loads, where i is an integer greater than one, based on:

$$UF_i * \frac{\text{Lifetime } V2X \text{ Discharge Energy}}{\text{Virtual Odometer Consumption}},$$

and $$\text{Virtual Odometer}_{total} = \sum_{i=1}^{N} \text{Virtual Odometer}_i,$$

where $UF_i$ corresponds to a utility factor for an $i^{th}$ one of the one or more V2X loads.

16. The virtual odometer of claim 10, further comprising an interface to enable at least one of a customer and a manufacturer to at least one of:

change an active/inactive mode for the one or more V2X loads; and restrict output to the one or more V2X loads.

* * * * *